(12) United States Patent
Wang et al.

(10) Patent No.: US 8,782,709 B2
(45) Date of Patent: Jul. 15, 2014

(54) METHOD AND APPARATUS FOR PROVIDING A PROGRAM GUIDE HAVING SEARCH PARAMETER AWARE THUMBNAILS

(75) Inventors: Zhibing Wang, Beijing (CN); Ting-hao Yang, Beijing (CN); Yizhe Tang, Beijing (CN); Qian Chang, Beijing (CN)

(73) Assignee: Hulu, LLC, Santa Monica, CA (US)

( * ) Notice: Subject to any disclaimer, the term of this patent is extended or adjusted under 35 U.S.C. 154(b) by 733 days.

(21) Appl. No.: 12/389,249

(22) Filed: Feb. 19, 2009

(65) Prior Publication Data

US 2010/0211584 A1 Aug. 19, 2010

(51) Int. Cl.
*G06F 3/00* (2006.01)
*H04N 21/482* (2011.01)

(52) U.S. Cl.
CPC ........... *H04N 21/482* (2013.01); *Y10S 707/915* (2013.01)
USPC ................ 725/53; 707/769; 707/915; 725/41

(58) Field of Classification Search
CPC .......... H04N 21/4828; H04N 21/4532; H04N 21/4821; H04N 21/4314; H04N 21/47202; H04N 21/4332; H04N 5/4403; H04N 21/23109
USPC .............................. 725/41, 53; 707/769, 915
See application file for complete search history.

(56) References Cited

U.S. PATENT DOCUMENTS

| | | | |
|---|---|---|---|
| 5,761,655 A * | 6/1998 | Hoffman ............................... | 1/1 |
| 5,832,494 A | 11/1998 | Egger et al. | |
| 5,892,536 A | 4/1999 | Logan et al. | |
| 5,986,692 A | 11/1999 | Logan et al. | |
| 6,088,455 A | 7/2000 | Logan et al. | |
| 6,931,451 B1 | 8/2005 | Logan et al. | |
| 7,055,166 B1 | 5/2006 | Logan et al. | |
| 7,058,376 B2 | 6/2006 | Logan et al. | |
| 8,448,210 B2 * | 5/2013 | Gorsuch et al. ................. | 725/50 |

(Continued)

FOREIGN PATENT DOCUMENTS

EP 1197020 11/2007
GB 2443959 5/2008

(Continued)

OTHER PUBLICATIONS

"Gotuit and Pixsy Raise the Bar on Video Search," http://www.gotuit.com/press/2008/0930_Pixsy.html, 3 pages.

(Continued)

*Primary Examiner* — Cheyne D Ly
(74) *Attorney, Agent, or Firm* — Fountainhead Law Group P.C.

(57) ABSTRACT

A method, apparatus, article of manufacture, and a memory structure for presenting a program guide for a video-on-demand system describing a plurality of media programs, each media program having a plurality of video frames. In one embodiment, the method comprises the steps of accepting a search request from a user, the search request comprising a search parameter having a search value; searching the media program database for the search value, the media program database having first metadata associated with a first individual video frame of the media program; and providing the program guide comprising a thumbnail depicting the first individual video frame of the media program associated with the first metadata to the user if the first metadata includes the search value.

42 Claims, 11 Drawing Sheets

(56) References Cited

U.S. PATENT DOCUMENTS

| | | |
|---|---|---|
| 2002/0033842 A1* | 3/2002 | Zetts ........................... 345/719 |
| 2002/0188621 A1* | 12/2002 | Flank et al. ................ 707/104.1 |
| 2003/0163823 A1 | 8/2003 | Logan et al. |
| 2004/0255330 A1 | 12/2004 | Logan |
| 2004/0255334 A1 | 12/2004 | Logan |
| 2004/0255336 A1 | 12/2004 | Logan et al. |
| 2004/0255340 A1 | 12/2004 | Logan |
| 2004/0268386 A1 | 12/2004 | Logan et al. |
| 2005/0005308 A1 | 1/2005 | Logan et al. |
| 2005/0044561 A1 | 2/2005 | McDonald |
| 2005/0047681 A1* | 3/2005 | Hori et al. .................... 382/305 |
| 2006/0015925 A1 | 1/2006 | Logan |
| 2006/0190808 A1 | 8/2006 | Balthaser |
| 2006/0280437 A1 | 12/2006 | Logan et al. |
| 2007/0112852 A1* | 5/2007 | Sorvari et al. ............. 707/104.1 |
| 2007/0239683 A1* | 10/2007 | Gallagher ........................ 707/3 |
| 2008/0022230 A1* | 1/2008 | Ogawa et al. ................. 715/838 |
| 2008/0060001 A1 | 3/2008 | Logan et al. |
| 2008/0086688 A1* | 4/2008 | Chandratillake et al. ..... 715/719 |
| 2008/0189617 A1 | 8/2008 | Covell et al. |
| 2008/0209066 A1* | 8/2008 | Spio et al. .................... 709/231 |
| 2008/0270449 A1* | 10/2008 | Gossweiler et al. .......... 707/102 |
| 2009/0024292 A1 | 1/2009 | Schrock et al. |
| 2009/0092373 A1* | 4/2009 | Hiyama ........................ 386/83 |
| 2010/0082585 A1* | 4/2010 | Barsook et al. ............... 707/706 |
| 2010/0158099 A1 | 6/2010 | Kalva et al. |
| 2013/0254807 A1* | 9/2013 | Gorsuch et al. ................ 725/40 |

FOREIGN PATENT DOCUMENTS

| | | |
|---|---|---|
| WO | 0058940 | 10/2000 |
| WO | WO 2005/003899 | 1/2005 |
| WO | 2007030621 | 3/2007 |
| WO | 2007030751 | 3/2007 |
| WO | 2007130472 | 11/2007 |

OTHER PUBLICATIONS

"Gotuit Announces Integration with DoubleClick," http://www.gotuit.com/press/2008/1022_DoubleClick.html, 1 page.

"Gotuit Publishes White Paper: 'The Currency of Internet Video,'" http://www.gotuit.com/press/2008/1028_Whitepaper_CurrencyOfInternetVideo.html, 1 page.

"The Currency of Internet Video: The Importance of Quality Metadata in Monetizing Internet Video," Gotuit White Paper, Oct. 2008, pp. 1-13.

* cited by examiner

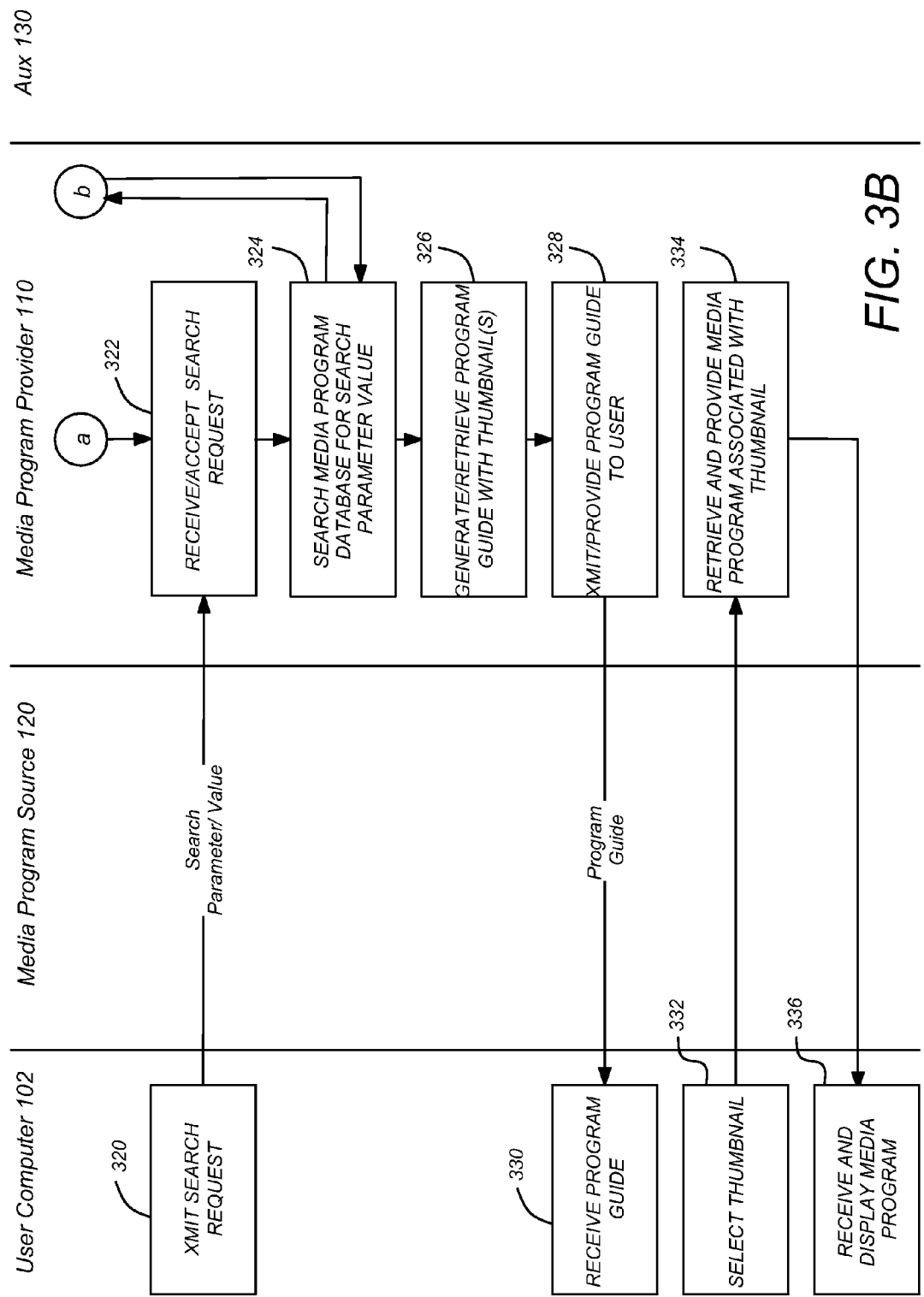

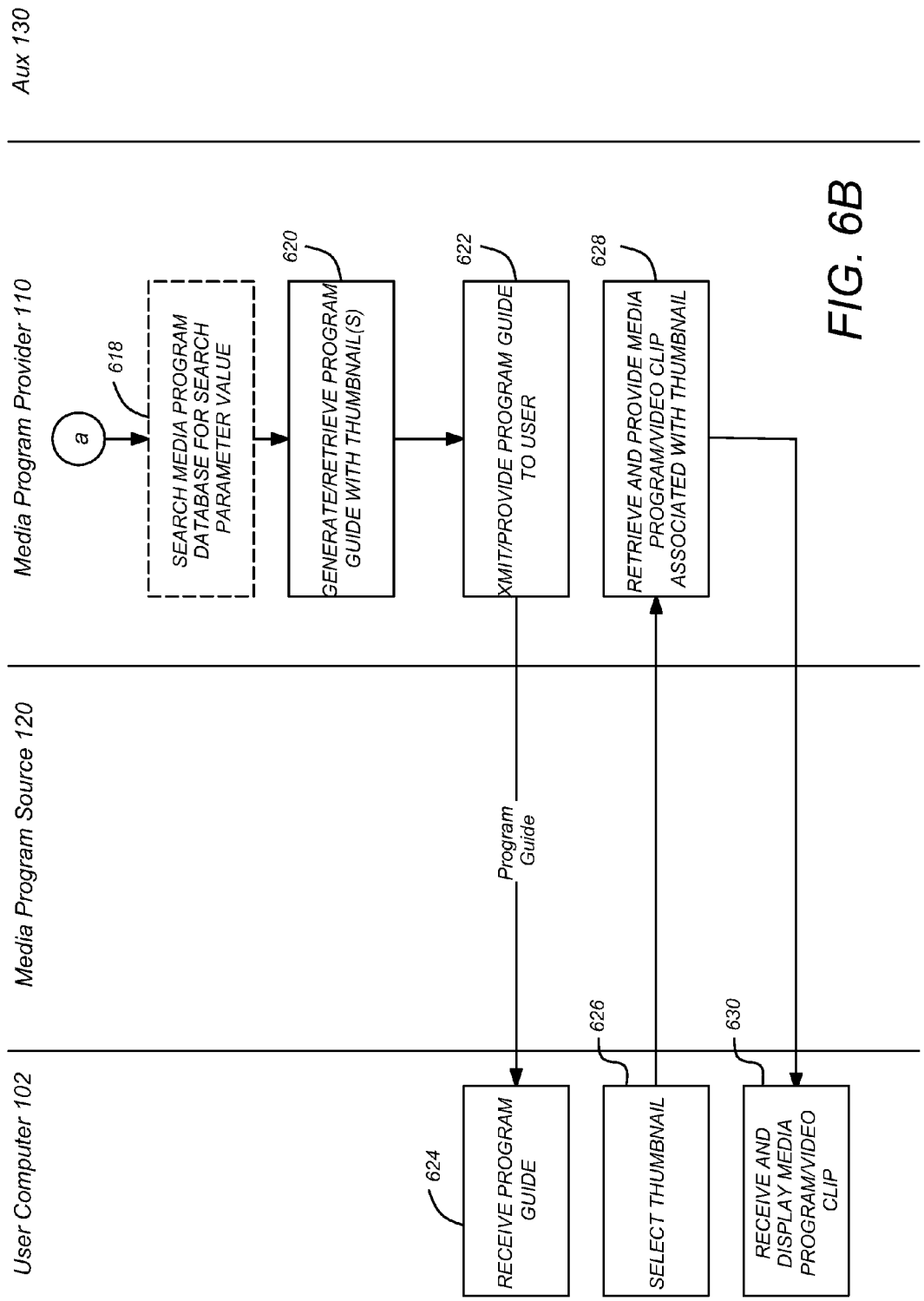

METHOD AND APPARATUS FOR PROVIDING A PROGRAM GUIDE HAVING SEARCH PARAMETER AWARE THUMBNAILS

BACKGROUND OF THE INVENTION

1. Field of the Invention

The present invention relates to systems and methods for providing programming guides to users, and in particular, to a system and method for providing a program guide having search parameter-aware thumbnails.

2. Description of the Related Art

The dissemination and playback of media programs has undergone substantial changes in the past decade. Previously, media programs were disseminated either by analog broadcast (conventional, satellite, or cable) or by dissemination of films to movie theaters.

These traditional dissemination and playback means remain in use after the advent of digital technology. However, digital technologies have had a profound effect on the dissemination and playback of media programs.

First, digital technology permitted the use of digital video recorders (DVRs). DVRs, while similar in function to standard analog video cassette recorders (VCRs), provide a number of additional useful functions including live pause, the ability to record one program while playing back another, and the integration of the electronic program guides with DVR functionality (so that the recordation of media programs could be scheduled far in advance).

Second, technology also permitted the dissemination and playback of media programs via the Internet, and with improved signal processing and more and more households with high-speed Internet access (e.g. DSL, fiber, satellite), this method of dissemination and playback has become competitive with traditional means. Dissemination of media programs via the Internet may occur either by simple downloading, progressive downloading or streaming.

For progressive download, a media file having the media program is downloaded via the Internet using dial-up, DSL, ADSL, cable, T1, or other high speed internet connections. Simple downloading downloads the bytes of the media file in any convenient order, while progressive download downloads bytes at the beginning of a file and continues downloading the file sequentially and consecutively until the last byte. At any particular time during progressive downloading, portions of the file are not immediately available for playback. In some situations, the entire file must be downloaded first before a media player can start playback. In other situations, media players are able to start playback once enough of the beginning of the file has downloaded, however, the media player must download enough information to support some form of playback before playback can occur. Playback is often delayed by slow Internet connections and is also often choppy and/or contains a high likelihood of stopping after only a few seconds. Downloaded material is thereafter stored on the end-user computer.

Streaming delivers media content continuously to a media player and media playback occurs simultaneously. The end-user is capable of playing the media immediately upon delivery by the content provider. Traditional streaming techniques originate from a single provider delivering a stream of data to a set of end-users. High bandwidths and central processing unit (CPU) power are required to deliver a single stream to a large audience, and the required bandwidth of the provider increases as the number of end-users increases.

Unlike progressive downloading, streaming media is delivered on-demand or live. Wherein progressive download requires downloading the entire file or downloading enough of the entire file to start playback at the beginning, streaming enables immediate playback at any point within the file. End-users may skip through the media file to start playback or change playback to any point in the media file. Hence, the end-user does not need to wait for the file to progressively download. Typically, streaming media is typically delivered from a few dedicated servers having high bandwidth capabilities.

On-demand streaming media services allow a broad spectrum of media programs to be made available to the user for immediate viewing. One of the challenges in providing on-demand streaming media services is to provide the user with an interface that allows the user to efficiently select which media program they would like to view. In the golden era of broadcast television, a small number of channels were available, and it was a simple matter for the user to simply check each channel or refer to a printed guide. The advent of satellite or cable television multiplied the number of such channels, and provided program guides similar to the printed schedules. However, the number of channels was still relatively limited. The storage capacity of DVRs is such that simple hierarchical menu interfaces permit the user to easily and quickly gain access to recorded programs. However, in the case of streaming video, the number of available media programs is virtually boundless. This raises the very real problem of how to provide useful program information about a very large number of media programs.

One way to provide the user with information about available media programs is to make use of metadata associated with the media programs. Such metadata may include factors such as the source of the media program, actors, genre (drama, comedy), target age group, and/or one or more thumbnails (small still video frames of the media program) of the media program. This metadata can then be used to assist the user in searching for the media program of interest or to assist the media program disseminator to organize the media programs in a way that conveniently allows the user to find the media program of interest.

A typical response to a search for media programs involving a particular performer (e.g. actor or actress), is to provide a textural list of such programs, along with other relevant information. The list may or may not include thumbnails of frames of the media program as well. Such thumbnails are typically a title page (showing the title of the media program) or a frame of the media program that is randomly chosen.

However, when responding to a search for media programs, thumbnails that show the title of the program or randomly chosen frames do not provide the user with useful information. What is far more useful in such instances is providing a thumbnail that is related to the search parameter that was provided. For example, if the user searches for media programs that have a particular actor, it is desirable for the program guide to present thumbnails that include a depiction of that performer. It would also be desirable for the program guide to present dynamically generated video clips that include a depiction of the performer.

Further, often, the user is interested not only in finding a particular program, but an object in a scene from a particular program. For example, the user may be interested in finding a media program in which a particular actor is portrayed in a particular scene.

Media program searches are provided in existing systems such as those available from GOOGLE and YOUTUBE. Such systems accept keyword searches, search media program metadata to identify media programs that may include images of the searched keywords. However, for each video provided in response to the search, the thumbnail that is provided is the same regardless of the search parameters or their values. For example, a search for the actress Meg Ryan may return a number of thumbnails, each representing a media program (and many of them only short clips) in which Meg Ryan is depicted. However, the thumbnail that is presented for each media program file is the same, regardless of the search parameter provided. That is because while each media program file may include metadata having the term "Meg Ryan," (indicating that Meg Ryan is depicted in at least part of the media program file), there is no metadata associated with individual frames of the media program file (indicating that she is depicted in the frame), nor does the metadata for the media program file indicate the frame(s) in which Meg Ryan is depicted.

For example, in the prior art, a particular media program file "When_Harry_Met_Sally" may include metadata describing the actors appearing in the media program, and those actors may include "Meg Ryan" and "Billy Crystal." The media program file "When_Harry_Met_Sally" may also be associated with a thumbnail image of one of the video frames that depicts the actress Meg Ryan. In such a case, when the user performs a keyword search using an "performer" search parameter having "Meg Ryan" as the value, the media program file "When_Harry_Met_Sally" may be presented, along with a thumbnail of a video frame that depicts the actress Meg Ryan. However, if the user were to perform a keyword search using the "performer" search parameter having the value "Billy Crystal", the user would be presented with the same program file "When_Harry_Met_Sally", but the associated thumbnail would still depict the same video frame (that is, of Meg Ryan, not Billy Crystal). The user might also be presented with a different media program file (e.g. another media program file of "When_Harry_Met_Sally" in which the associated thumbnail depicts Billy Crystal), but the thumbnail associated with the same media program file would still depict Meg Ryan, not Billy Crystal. Hence, the user is not presented with a "search aware" or "search responsive" thumbnail in which the thumbnail presented for a particular media program file depends on the value of the search parameter.

Randomly selected frames of the media program file may provide little or no information about the media program of interest, and may misrepresent its content. The thumbnail may also include an image that is not appropriate for general dissemination (e.g. an adult video). What is needed is a method and apparatus that provides search term-aware thumbnails of media program files. The present invention satisfies that need.

SUMMARY OF THE INVENTION

To address the requirements described above, a method, apparatus, article of manufacture, and a memory structure for presenting a program guide is presented. In one embodiment, the method comprises the steps of receiving the media program, the media program received from a media program source wherein the media program comprises a plurality of video frames, searching the plurality of video frames of the received media program to identify a video frame that depicts an object; generating thumbnail metadata for the identified video frame, the thumbnail metadata relating information describing the object to an identifier of the identified video frame that depicts the object; associating the thumbnail metadata with the media program in a media program database; accepting the search request from a user, the search request comprising a search parameter having a search value; searching the media program database for the search value; and providing a thumbnail of the video frame that depicts the object for display if the search value matches the information describing the object.

In another embodiment, the invention is embodied by a method for presenting a program guide for a video-on-demand system describing a plurality of media programs, each media program having a plurality of video frames. In one embodiment, the method comprises the steps of accepting a search request from a user, the search request comprising a search parameter having a search value; searching the media program database for the search value, the media program database having first metadata associated with a first individual video frame of the media program; and providing the program guide comprising a thumbnail depicting the first individual video frame of the media program associated with the first metadata to the user if the first metadata includes the search value.

In yet another embodiment, the invention is embodied by a method for presenting a program guide for a plurality of media programs, each media program having a plurality of video frames. In one embodiment, the method comprises the steps of accepting a search request from a user, the search request comprising a search parameter having a search value; searching a media program database, the media program database having metadata comprising an object description associated with information identifying at least one video frame in which the object is depicted; providing a program guide having a thumbnail depicting the at least one video frame in which the object is depicted to the user if the search value matches the object description.

In other embodiments, the invention is embodied by an apparatus comprising means for performing the foregoing operations or a data storage device tangibly embodying instructions to perform the method steps described above.

BRIEF DESCRIPTION OF THE DRAWINGS

Referring now to the drawings in which like reference numbers represent corresponding parts throughout:

FIGS. 3A and 3B are diagrams illustrating exemplary process steps that can be used to practice one embodiment;

FIGS. 6A and 6B are diagrams depicting the dynamic generation of thumbnails and/or video clips and thumbnail/video clip metadata in response to a user's search request;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Figure 1:
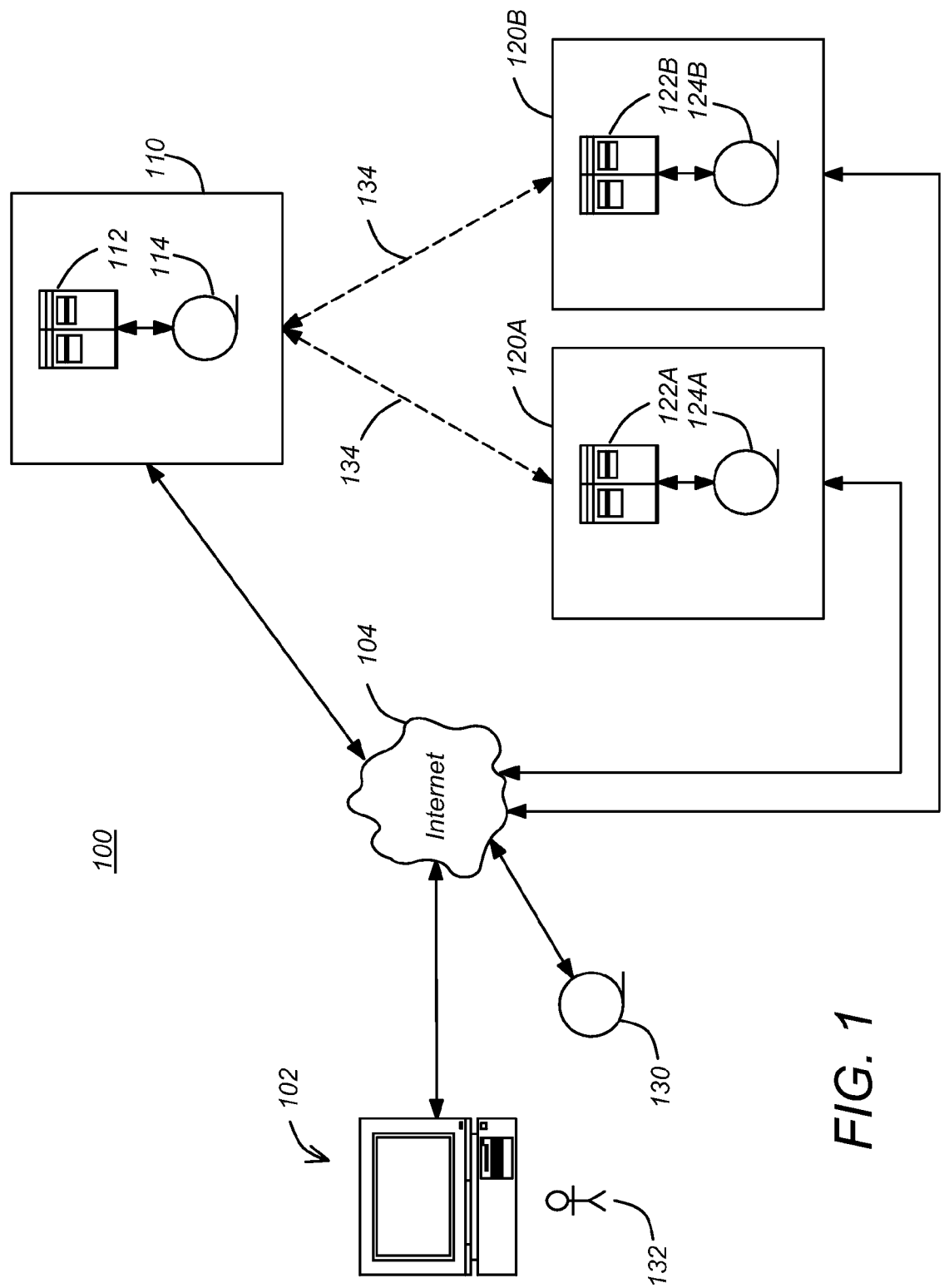
FIG. 1 is a diagram illustrating an exemplary media program system.

FIG. 1 is a diagram illustrating an exemplary media program system 100. In the illustrated embodiment, the system 100 comprises a one or more media program sources 120A, 120B, communicatively coupled to a communication network 104 such as the Internet and each having one or more source video servers 122A, 122B communicatively coupled to one or more source media program databases 124A, 124B. The media program system 100 further comprises and a media program provider 110, communicatively coupled to the communication network 104, and having one or more provider video servers 112 and a provider media program database 114. In one embodiment, the media program provider 110 is a video-on-demand and/or streaming media program provider.

The media program system 100 may stream media programs to the user's computer 102 directly from the media program provider 110, or the media program provider 110 may operate as a portal, providing an interface to the media programs available from the media program sources 120A and 120B, but not the media program itself (which is instead provided by the media program source 120).

In the first case, the media program provider licenses media programs from the media program sources 120 (such as www.fox.com or www.nbc.com), and metadata for such programs is also typically provided as well. Such metadata is typically adequate (e.g. it need not be supplemented by information from other sources) and can be retrieved by the media program provider's database 114 for use.

In the second case (e.g. when direct streaming is not licensed), the media programs are streamed to the user's computer 102 directly from the servers of the media program source 120. When the media program is streamed directly from the media program source 120, it is often the case that the metadata provided by the media program source 120 is insufficient. In such cases, supplementary metadata may be obtained from independent media program source 130 (such as www.tv.com or www.imdb.com) or other third party sources. In this circumstance, the role of the media program provider 110 is that of a portal that provides users a list of available media programs and an interface to search to find such programs and to view them.

Media programs and metadata may be obtained via the communication network 104 or through auxiliary (and/or dedicated) communication links 134 by webcrawling (for example, using a program or automated script that browses the World Wide Web in a methodical, automated manner).

Using the computer 102, remote users 132 can communicate with the media program provider 110, to obtain media programs (including video-on-demand and/or streaming video services) and to search the provider media program database 114 to find media programs of interest.

Figure 2:
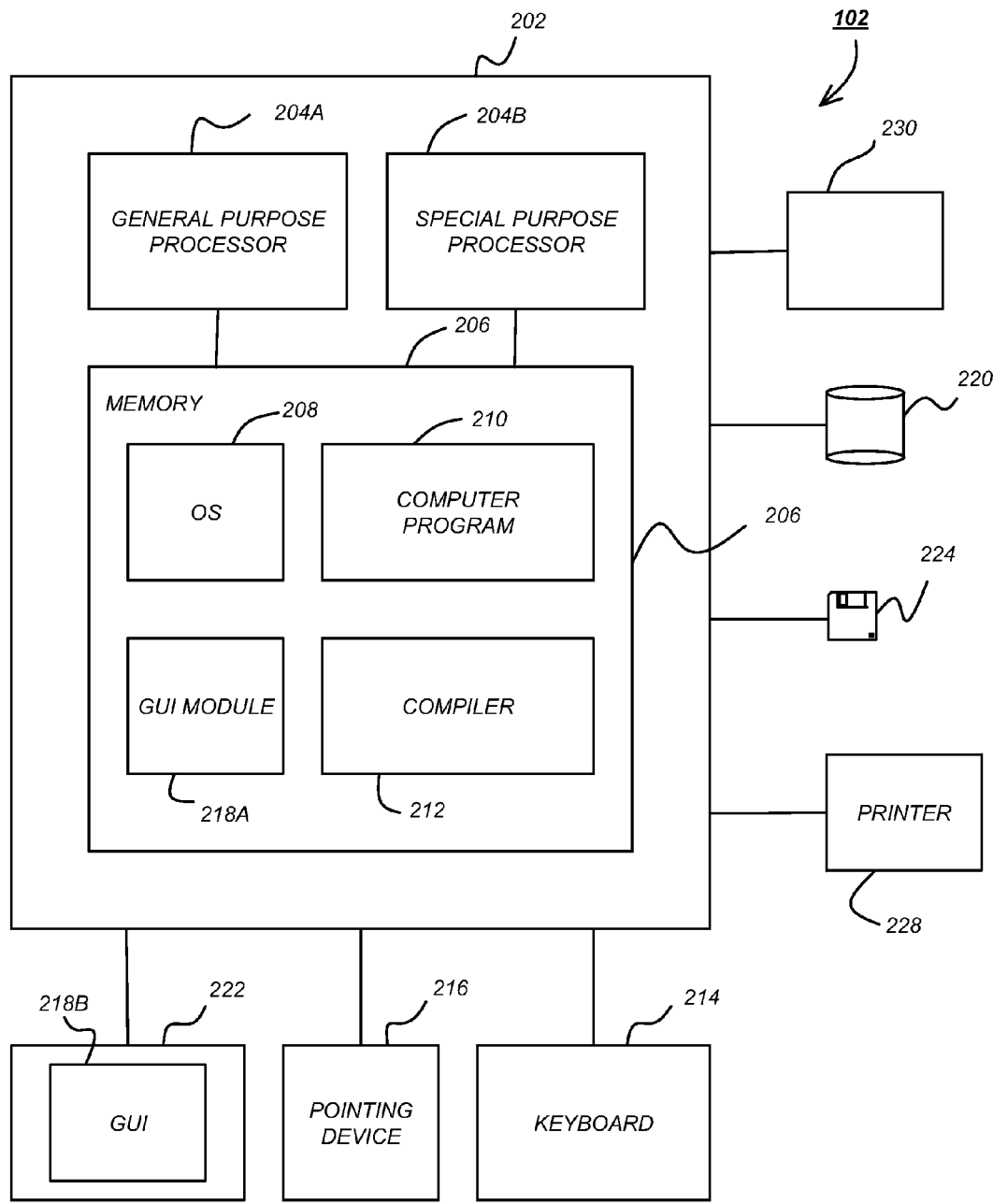
FIG. 2 illustrates an exemplary computer system that could be used to implement the present invention.

FIG. 2 illustrates an exemplary computer system 202 that could be used to implement elements the present invention, including the user computer 102 and the databases 114, 124. The computer 202 comprises a general purpose hardware processor 204A and/or a special purpose hardware processor 204B (hereinafter alternatively collectively referred to as processor 204) and a memory 206, such as random access memory (RAM). The computer 202 may be coupled to other devices, including input/output (I/O) devices such as a keyboard 214, a mouse device 216 and a printer 228.

In one embodiment, the computer 202 operates by the general purpose processor 204A performing instructions defined by the computer program 210 under control of an operating system 208. The computer program 210 and/or the operating system 208 may be stored in the memory 206 and may interface with the user and/or other devices to accept input and commands and, based on such input and commands and the instructions defined by the computer program 210 and operating system 208 to provide output and results.

Output/results may be presented in GUI 218B on the display 222 or provided to another device for presentation or further processing or action. In one embodiment, the display 222 comprises a liquid crystal display (LCD) having a plurality of separately addressable liquid crystals. Each liquid crystal of the display 222 changes to an opaque or translucent state to form a part of the image on the display in response to the data or information generated by the processor 204 from the application of the instructions of the computer program 210 and/or operating system 208 to the input and commands. The image may be provided through a graphical user interface (GUI) module 218A. Although the GUI module 218A is depicted as a separate module, the instructions performing the GUI functions can be resident or distributed in the operating system 208, the computer program 210, or implemented with special purpose memory and processors.

Some or all of the operations performed by the computer 202 according to the computer program 110 instructions may be implemented in a special purpose processor 204B. In this embodiment, the some or all of the computer program 210 instructions may be implemented via firmware instructions stored in a read only memory (ROM), a programmable read only memory (PROM) or flash memory in within the special purpose processor 204B or in memory 206. The special purpose processor 204B may also be hardwired through circuit design to perform some or all of the operations to implement the present invention. Further, the special purpose processor 204B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 202 may also implement a compiler 212 which allows an application program 210 written in a programming language such as COBOL, C++, FORTRAN, or other language to be translated into processor 204 readable code. After completion, the application or computer program 210 accesses and manipulates data accepted from I/O devices and stored in the memory 206 of the computer 202 using the relationships and logic that was generated using the compiler 212.

The computer 202 also optionally comprises an external communication device such as a modem, satellite link, Ethernet card, or other device for accepting input from and providing output to other computers.

In one embodiment, instructions implementing the operating system 208, the computer program 210, and the compiler 212 are tangibly embodied in a computer-readable medium, e.g., data storage device 220, which could include one or more fixed or removable data storage devices, such as a zip drive, floppy disc drive 224, hard drive, CD-ROM drive, tape drive, etc. Further, the operating system 208 and the computer program 210 are comprised of computer program instructions which, when accessed, read and executed by the computer 202, causes the computer 202 to perform the steps necessary to implement and/or use the present invention or to load the program of instructions into a memory, thus creating a special purpose data structure causing the computer to operate as a specially programmed computer executing the method steps described herein. Computer program 210 and/or operating instructions may also be tangibly embodied in memory 206 and/or data communications devices 230, thereby making a computer program product or article of manufacture according to the invention. As such, the terms "article of manufacture," "program storage device" and "computer program product" as used herein are intended to encompass a computer program accessible from any computer readable device or media.

Of course, those skilled in the art will recognize that any combination of the above components, or any number of different components, peripherals, and other devices, may be used with the computer 202.

Figure 3A:
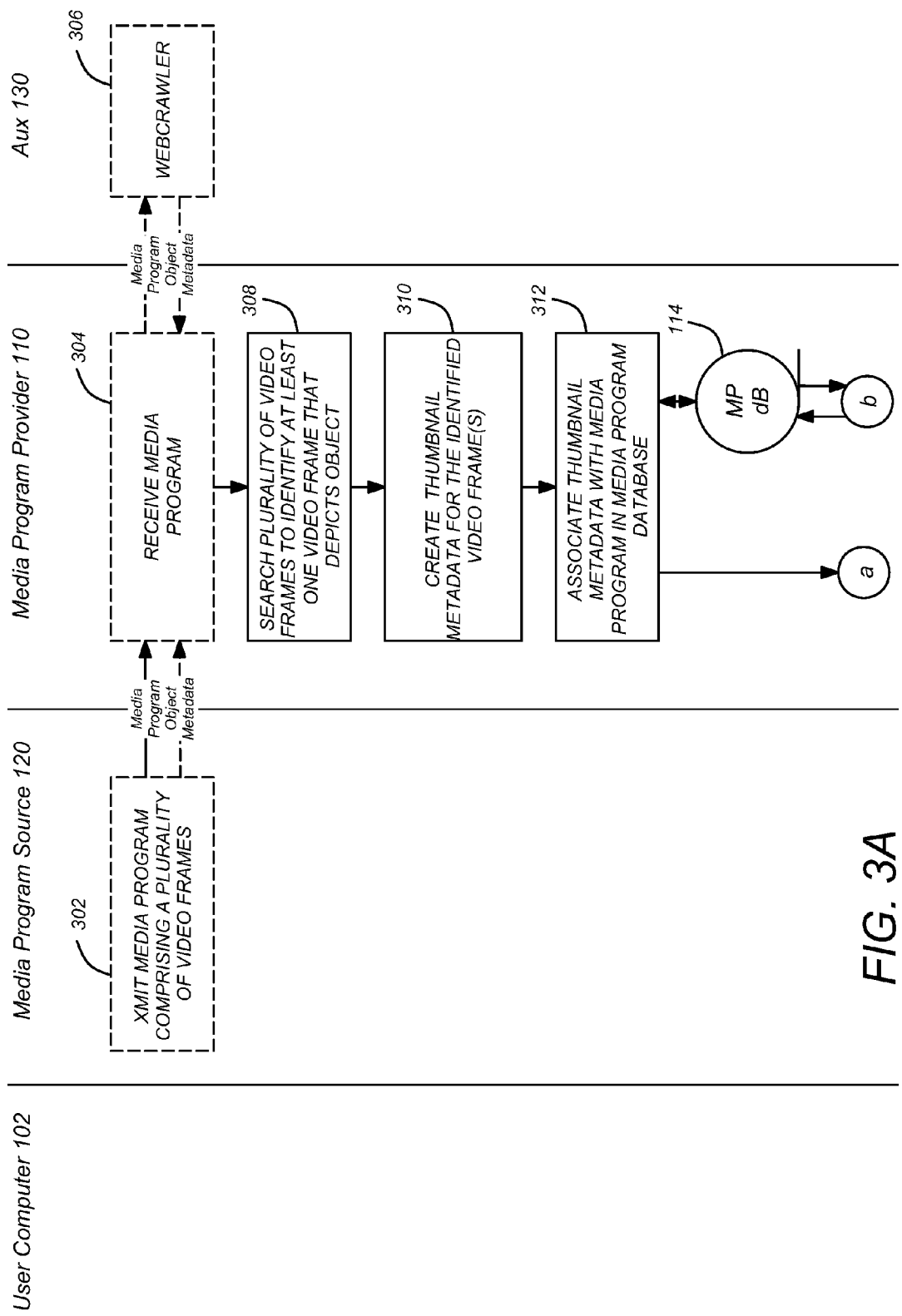

FIG. 3A is a diagram illustrating exemplary process steps that can be used to practice one embodiment of the present invention. As described above, the media program provider 110 may be the source of the media programs and the metadata that describes the media programs, or the media program provider 110 may obtain media programs and/or metadata about the media programs from media program sources 120 or independent media program metadata sources 130. In block 302, the media program is transmitted from a media program source 120 to the media program provider 110. The media program comprises a plurality of frames, each frame providing one of the images that together comprise the media program.

In addition to the media program, the media program source 120 may also transmit metadata about the media program. Such metadata may include general metadata about the media program itself and/or object metadata describing an object depicted in the media program. The media program and/or metadata is received by the media program provider 110, as shown in block 304. As shown in block 306, the media program provider 110 may also obtain metadata about media programs, including object metadata from independent media program metadata providers 130. Blocks 302 and 306 are dashed to indicate that they need not be performed in cases where the media program provider 110 already has the media program and any metadata necessary to complete the remainder of the operations depicted in FIGS. 3A and 3B. The media program may be transmitted from the media program source 120 to the media program provider 110 using the simple downloading, progressive downloading or streaming techniques described above.

In block 308, the plurality of frames of the media program are searched to identify at least one video frame that depicts an object. The object may be a performer, a building, or any object that is visually depicted in at least one of the frames of the media program. In the case where the media program is obtained from the media program source 120 by progressive downloading or streaming, the searching step may be accomplished by the media program provider 110 as the video data is received.

In one embodiment, the searching step is performed for one or more of the objects identified in the object metadata obtained from the media program source 120 or the independent media program metadata source 130. This operation can be accomplished as described further with respect to FIG. 4 as described below.

Metadata is created for the identified video frames, as shown in block 310. In one embodiment, the metadata is media program metadata that identifies the object and the frame(s) in which the object is found (e.g. object(s)=<object name(s)>, frame(s)=<frame number(s)>). In another embodiment, the metadata is associated with the frame (it is frame metadata) and is used to generate thumbnail metadata. In either case, the frame can be identified by a frame number(s), by elapsed time(s) in the media program, or analogous means for identifying the frame(s). The metadata (whether associated with entire media program or an individual frame of the metadata) can be then used to generate metadata for thumbnails (created from one of the identified individual frames).

The identified metadata is then associated with the media program in the media program database 114, as shown in block 312. In one embodiment, the media program is associated with metadata describing the objects depicted in the media program and the frame number(s) of the frames that depict the object(s). For example, a movie may be associated with metadata describing the performers portraying characters in the movie. In this case, the video frames are searched for frames in which the performers are depicted, metadata identifying the performers and the frame(s) they are depicted is generated, and associated with the media program. This process can be repeated for every object identified in the metadata (e.g. for every performer).

Figure 4:
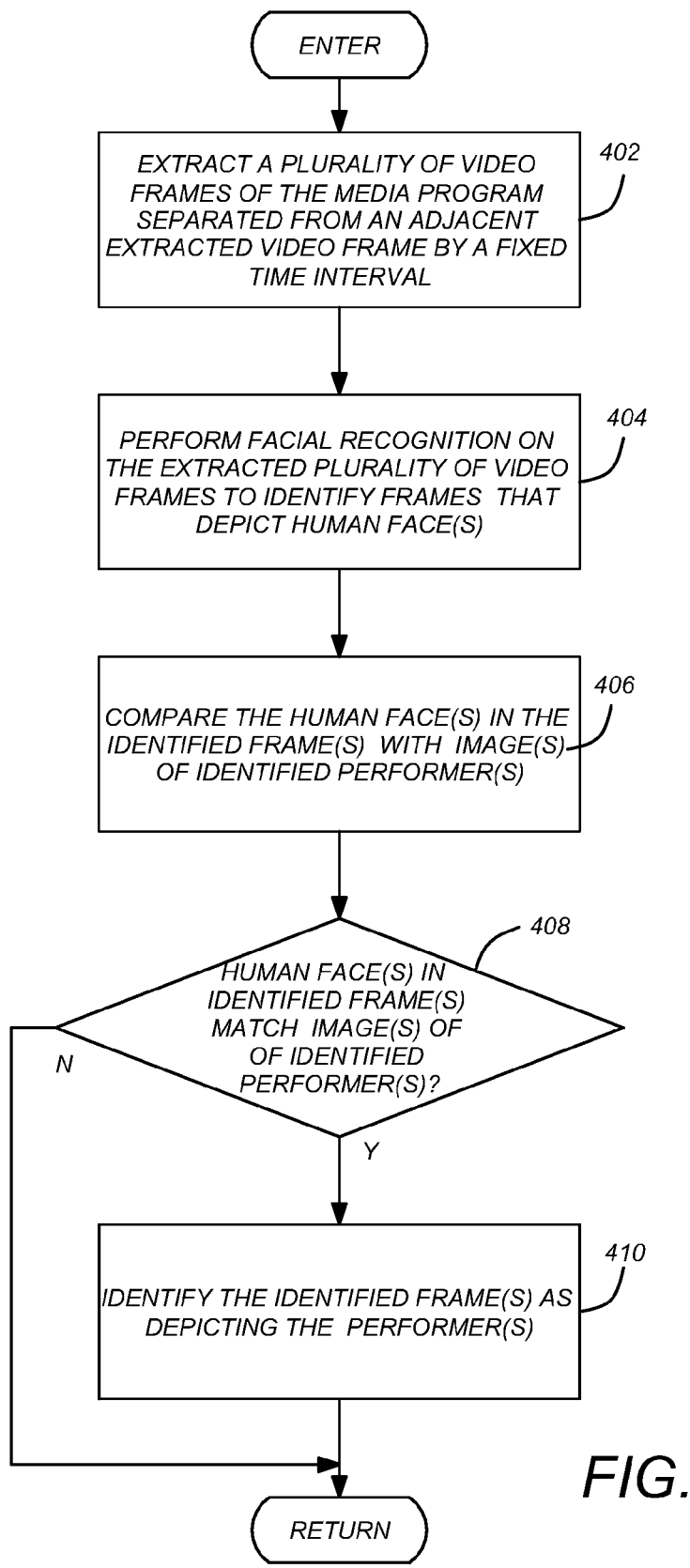
FIG. 4 is a diagram illustrating exemplary method steps that can be used to search a plurality of video frames to identify video frame(s) that depict an object.
Figure 5:
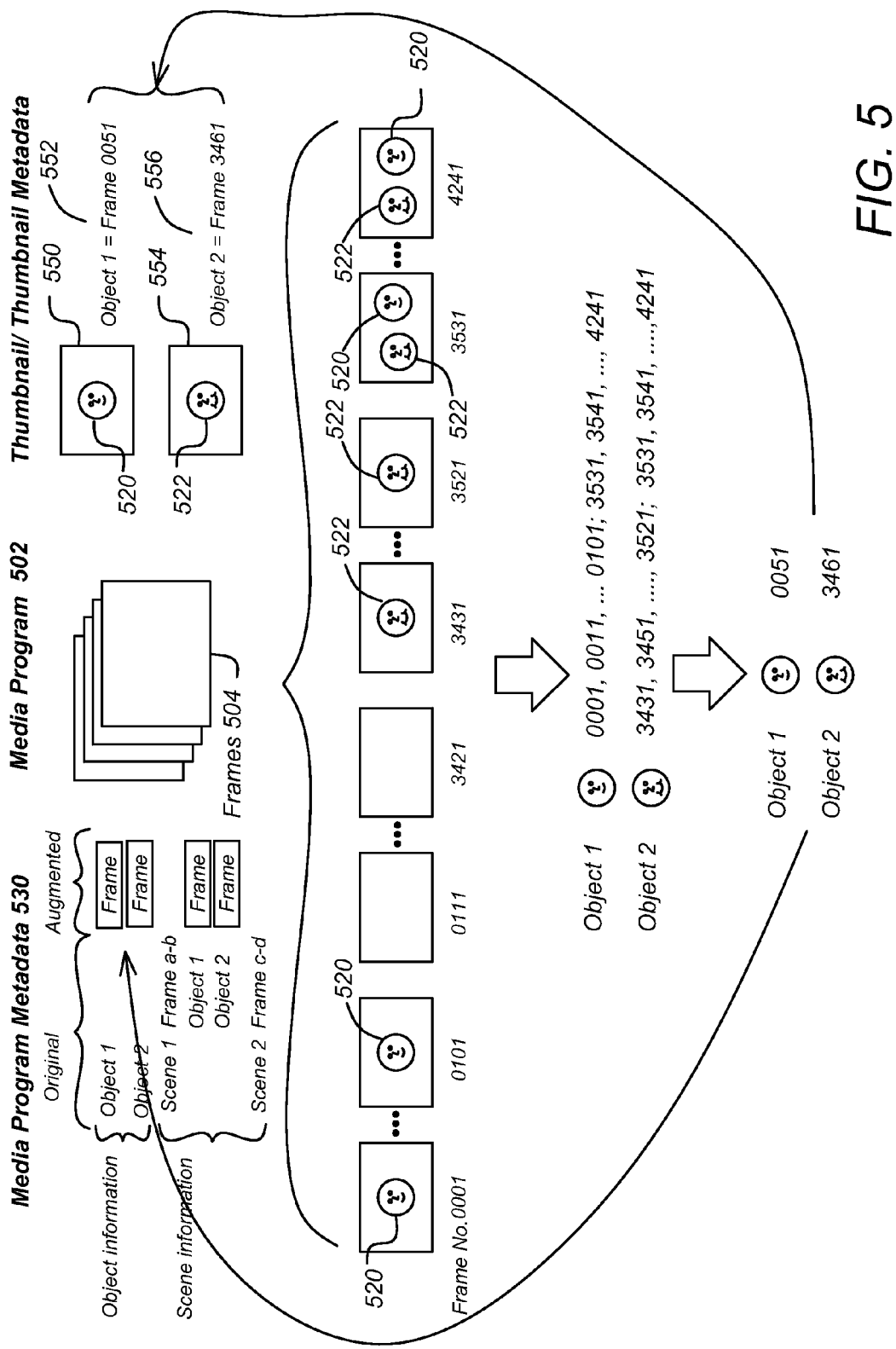
FIG. 5 is a diagram further illustrating the process steps illustrated in FIG. 4.

FIG. 4 is a diagram illustrating exemplary method steps that can be used to search a plurality of video frames to identify video frame(s) that depict an object, and FIG. 5 is a diagram further illustrating the process steps. A plurality of video frames 504 of the media program 502 are extracted from the media program, as shown in block 402. In one embodiment, the extracted video frames are separated from an adjacent video frame by a fixed time or frame interval. For example, every $10^{th}$ video frame may be extracted.

As shown in block 404, object recognition is performed on the extracted plurality of video frames to identify frames that depict the object of interest. For example, in one embodiment, an algorithm is used to recognize human faces, and the objects recognized comprise performer's faces. In the example shown, every 10th video frame 504 was extracted from the media program 502. Faces were recognized in video frames 0001, 0011, . . . , 0101 (which include a depiction of a first performer's face 520) frames 3431, 3441, . . . , 3521 (which include a depiction of a second performer's face 522), and frames 3531, 3541, . . . , 4241 (which include a depiction of both the first performer's face 520 and the second performer's face 522).

Next, as shown in block 406, the objects in the identified frames are compared to images of objects that known to be depicted in the media program 502. Information indicating which objects are known to be depicted in the media program 502 can be determined from the media program metadata 530 associated with the media program, as shown in FIG. 5, or may be inferred from other information. The media program metadata 530 may also include information regarding scenes in the media program 502, including the video frames at which each scene begins and ends.

In one embodiment, the objects are faces of the performers performing in the media program 502, and images of the performers are compared to the faces identified in block 404.

If the objects in the identified frames match images of the objects known to be in the media program, the such frames are identified as depicting the object, as shown in blocks 408-410. In the example shown in FIG. 5, the first performer's face 520 has been identified as being depicted in video frames 0001, 0011, . . . , 0101 and 3531, 3541, . . . , 4241, and the second performer's face 522 has been identified as being depicted in video frames 3431, 3441, . . . , 3521 and 3531, 3541, . . . , 4241.

In the typical case where the object is depicted in a plurality of frames, a smaller number of frames (preferably, those that best depict the object) can be selected. In the example illustrated in FIG. 5, frame 0051 was chosen as the best representation of the first performer 520, and frame 3461 was chosen as the best representation of the second performer. Which representation is "best" can be determined by visual inspection by a human, or can be done algorithmically by choosing frame(s) in which the match identified in block 408 is the closest match. Other factors may also be considered, including the video quality (e.g. image sharpness and/or contrast) or the size of the face. In this embodiment, for example, each of the potential matches can be associated with a confidence level, and the selected best representation is the match with the highest confidence level.

In a further embodiment described below in which the user's search retrieves video clips (instead of static thumbnails) of in which the object is depicted, if the object is depicted in a plurality of sequential frames, an identifier for the first and last frame depicting the object can be noted.

In one embodiment, information identifying the objects depicted in the media program and where (e.g. which frame) they are depicted is stored as augmenting media program metadata 530. In this embodiment, the metadata is associated with the media program instead of an individual frame, and when a user searches for an object in the media program 502, the metadata that indicates the frame(s) in which the object is depicted are retrieved, and a thumbnail is created from that frame, and presented to the user. In embodiments in which a video clip is presented, the metadata may indicate the first and last frame in which the object is depicted, and a thumbnail or video clip (possibly thumbnail sized) is created and presented to the user. In one embodiment, the video clip is activated by rolling the pointer over the thumbnail. In another embodiment, the video clip is activated as soon as it is downloaded, but audio is not played unless the pointer is rolled over the thumbnail or the video clip is otherwise selected. This allows multiple video clips to be portrayed without confusing audio from multiple sources.

In other embodiments, the metadata is associated with the frame in which the object is depicted, or is associated with a thumbnail that is generated from that frame. For example, one or more thumbnails 550, 554 may be generated from the frames depicting the object(s) (520 and 522, respectively), and thumbnail metadata (552 and 556, respectively) is generated describing those frames and the thumbnail metadata is associated with the media program 502. Such metadata can include the frame number, and an information identifying the object(s) depicted in the frame. In this embodiment, when a user searches for an object in the media program, the related thumbnail data is also searched, and the thumbnail depicting the object searched for is presented to the user. Or, the metadata describing objects depicted in a frame 502 of the media program may be simply associated with the frame 502 (instead of a thumbnail created from the frame). In this embodiment, when the user searches for an object in the media program, frame metadata is searched to find frames that depict the object. Thumbnails can then be generated from the found frames.

In yet another embodiment, the metadata does not necessarily describe an object, but rather, can describe a location, or a scene.

FIG. 3B is a diagram illustrating exemplary method steps that can be used to allow users to search the metadata to identify media program frames 504 depicting objects of interest. In block 320, a search request or search query is transmitted from the user computer 102. The search request may comprise a search parameter having a value. The search parameter may be a keyword, object name, or scene. The search request is received or accepted by the media program provider 110, as shown in block 322. In block 324, the media program database 114 is searched to for the search parameter value. In block 326, thumbnails that depict the object described by the parameter value and thus responsive to the search are generated (in embodiments where they are not generated in advance) or retrieved (in embodiments where they are generated in advance). The results are included in a program guide that is then transmitted to the user computer 102, as shown in block 328. The user computer 102 receives the program guide and displays the thumbnails to the user, as shown in block 330.

The user may then select the thumbnail, as shown in block 322. A message identifying the selected thumbnail or the associated media program is provided to the media program provider 110, which retrieves the media program associated with the thumbnail, as shown in block 334. The user computer 102 receives and displays the selected media program, as shown in block 336.

In embodiments where the media program itself is not streamed by the media program provider but rather by one of the media program sources 120, selection of the thumbnail transmits a message to the media program source 120 identifying the thumbnail or media program to be reproduced, and the media program is provided instead by the media program source 120. Although the media program is provided by the media program source 120 in this instance, the window displaying the media program may be embedded in a window supplied by the media program provider 110, thus providing the same look and feel to the user interface regardless of whether the media program is streamed from the media program provider 110 or the media program source 120.

The operations described in block 324 may be implemented in a number of ways. In one embodiment, the media program metadata 530 is searched to determine if the search parameter value matches information describing an object. If the search parameter value matches media program metadata 530 describing the object, the frame associated with the found value is determined, and used to generate a thumbnail that is later transmitted to the user computer 102 for display. For example, if the search parameter is a performer and the search parameter value is "Meg Ryan", the media program database 114 is searched for the value "Meg Ryan." By virtue of the operations described above, with respect to FIG. 3A, the media program database 114 includes a matching entry for "Meg Ryan" and an associated frame number which indicates which frame an image depicting her likeness can be found.

In another embodiment, the media program database 530 includes thumbnail or frame metadata, and media program database 530 is searched to find an entry (such as an object description) that includes the search parameter value. For example, if the user 132 entered "Meg Ryan" as the search value, the media program database 114 is searched to determine if the media program metadata 530 includes the entry "Meg Ryan." If so, the thumbnails associated with the "Meg Ryan" entry are retrieved from the media program database 530 and transmitted to the user computer 102 for display.

Typically, media programs 502 include a plurality of scenes, and a performer or other object may be depicted in more than one scene. In one embodiment, the media program database 114 includes media program metadata 530 that identifies the scene and the first and last frame of each scene. An example is shown in FIG. 5. In this embodiment, the frame number of the frame(s) depicting the desired object is presented for each of the scenes. For example, the media program metadata may include information organized as follows.

| Scene | Scene Frames | Object | Object Frame(s) |
|---|---|---|---|
| Diner | 3451-6782 | Meg Ryan | 3876 |
| Diner | 3451-6782 | Billy Crystal | 3896 |
| Airplane | 7891-9870 | Meg Ryan | 7932 |

In this embodiment, the user may also enter a search query specifying not only the object of interest, but the scene of interest as well (e.g. "Meg Ryan and Diner"). In this case, the media program database will create and return a thumbnail using frame 3876, since Meg Ryan is depicted in that frame in the diner scene of the movie.

While the foregoing description assumes that the thumbnail metadata is generated in advance of the user's search request, this need not be the case. Instead, the thumbnail metadata may be generated dynamically in response to the user's search request.

Figure 6A:
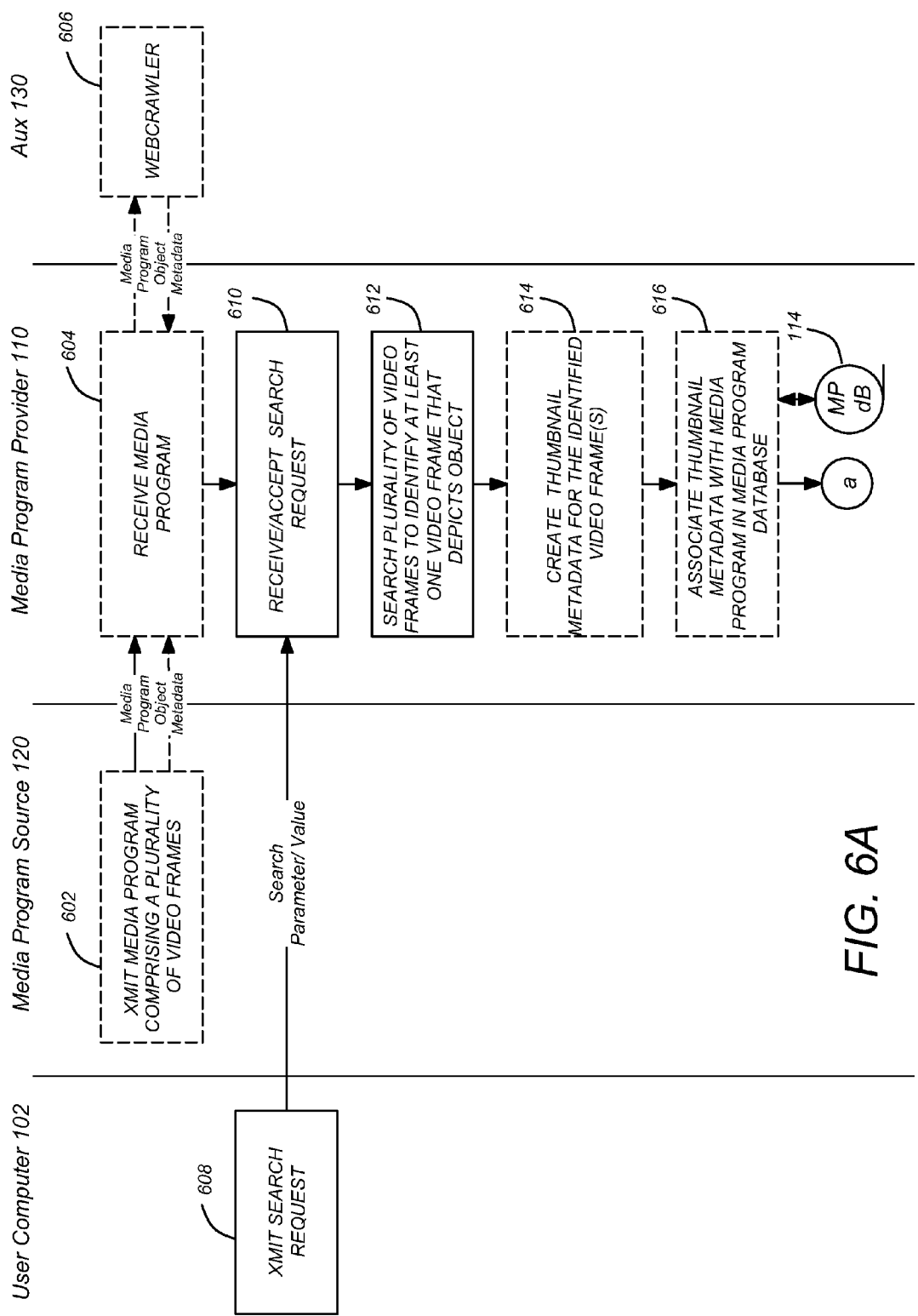

FIGS. 6A and 6B are diagrams depicting the dynamic generation of thumbnails 550 and thumbnail metadata 552 in response to a user's search request. In blocks 602-606, optional operations are performed to obtain the media program 502 and the media program metadata 530, using techniques analogous to those depicted in blocks 302-306. In block 608, the user computer 102 transmits a search request, which is received and accepted by the media program provider 110, as shown in block 610. In response to this search request, a search of the video frames 504 in the media program 502 is performed to identify one or more video frames 504 that depict the object described in the search request (e.g. matching one of the search parameter values).

At this point, the thumbnails 550, 554 can be generated using one or more of the identified video frames, a program guide can be generated with the thumbnails 550, 554, and the program guide may be transmitted to the user's computer 102 as shown in blocks 620-624.

However, since others users may also be interested in the same thumbnails 550, 554, another embodiment of the invention creates thumbnail metadata 552, 556 for the identified video frames, associates that thumbnail metadata 552, 556 with the media program 502 in the media program database 114, as shown in blocks 614 and 616. Once this data is stored in the media program database 114, similar search requests from other users may be more expeditiously obtained.

In a further embodiment, search requests are handled by searching the media program database 114 first to find metadata 552, 556 identifying video frames 504 depicting the requested object, and the media program video frames 504 are only searched if the media program database 114 if no such metadata 552, 556 can be found.

The foregoing technique(s) can also be used to provide video clips instead of or in addition to static thumbnails in response to search queries. Such video clips can be generated dynamically in response to a search query, or may be generated in advance. To generate video clips dynamically in response to a search query, the operations depicted in FIGS. 6A and 6B are performed, except the operation depicted in block 612 comprises searching the plurality of video frames in the media program to identify a sequential (but not necessarily consecutive) video frames that depict the object, thus defining the video clip depicting the object.

In one embodiment, a thumbnail depicting one of the identified plurality of sequential video frames is generated and used to create a program guide that is transmitted to the user as shown in blocks 620-624. This thumbnail is now associated with metadata identifying the first and last video frames of the clip, and when the user selects the thumbnail as shown in block 626, a command is provided to the media program provider 110 to retrieve and provide the video clip associated with the thumbnail as shown in block 628. The requested video clip may then be received and displayed as shown in block 630.

In another embodiment, a video clip depicting a plurality of the sequential video frames is generated and used to create the program guide that is transmitted to the user. In this case, the video clip may be associated with metadata identifying the first and last frames of the clip. In one embodiment, all video clips responsive to the search request are transmitted to the user's computer 102 for presentation and are presented as thumbnail sized video clips that automatically begin playing. In this embodiment, it is preferred that the audio for all but one of the running video clips be muted, as selected by the user 120 to avoid confusing the user with audio from a plurality of video clips. In another embodiment, a static thumbnail is presented for each video clip, and the video clip begins running only when the user 132 selects the video clip by rolling a pointer over the thumbnail or otherwise selecting it. Also, as was the case with respect to the static thumbnail embodiment described above, the selection of a thumbnail representing a video clip may provide a command to one of the media program sources 120 to cause the streaming of the media program associated with the thumbnail to commence.

Figure 7A:
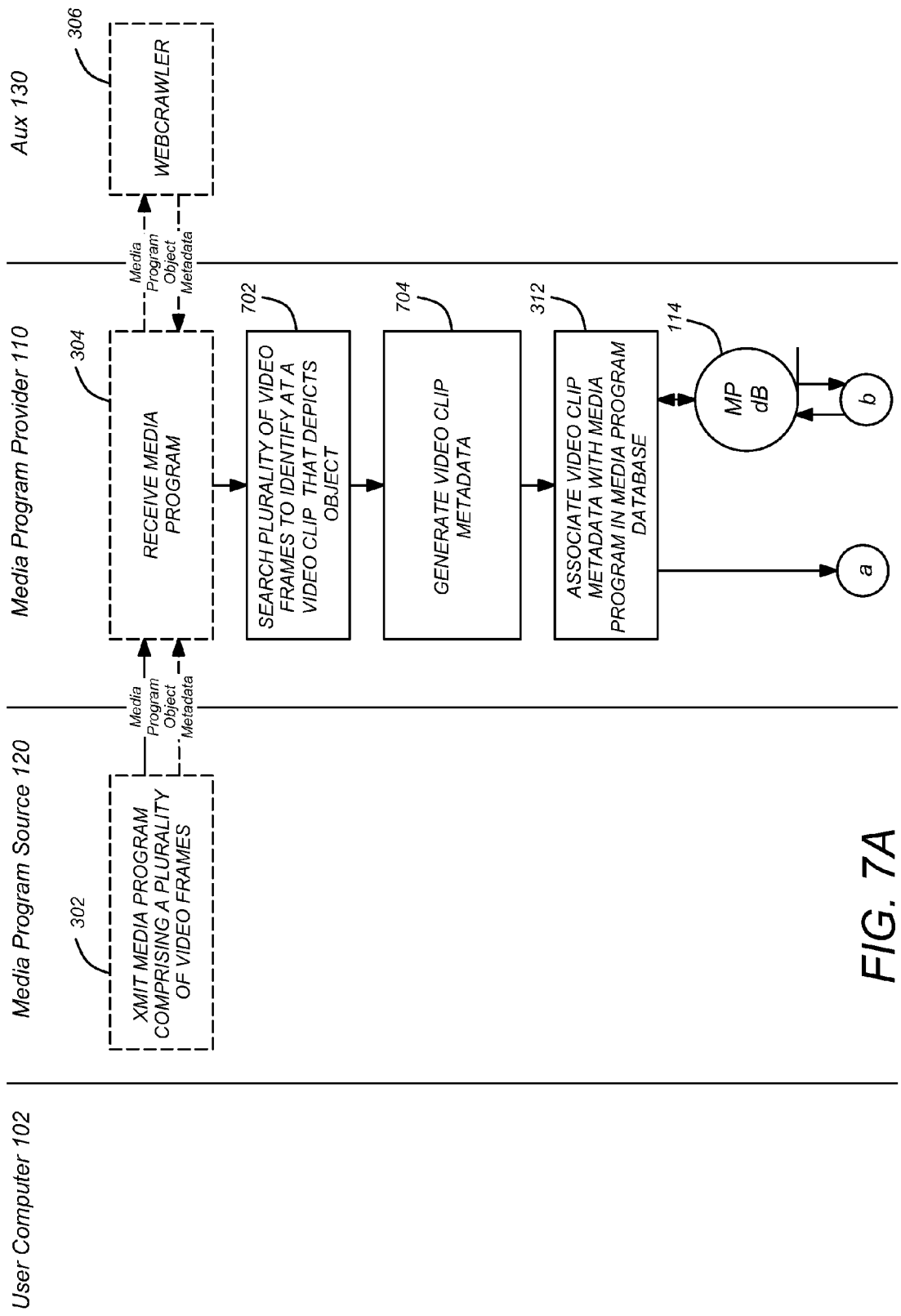
FIGS. 7A and 7B are diagram(s) depicting further exemplary method steps that can be used to generate and present search aware video clips.
Figure 7B:
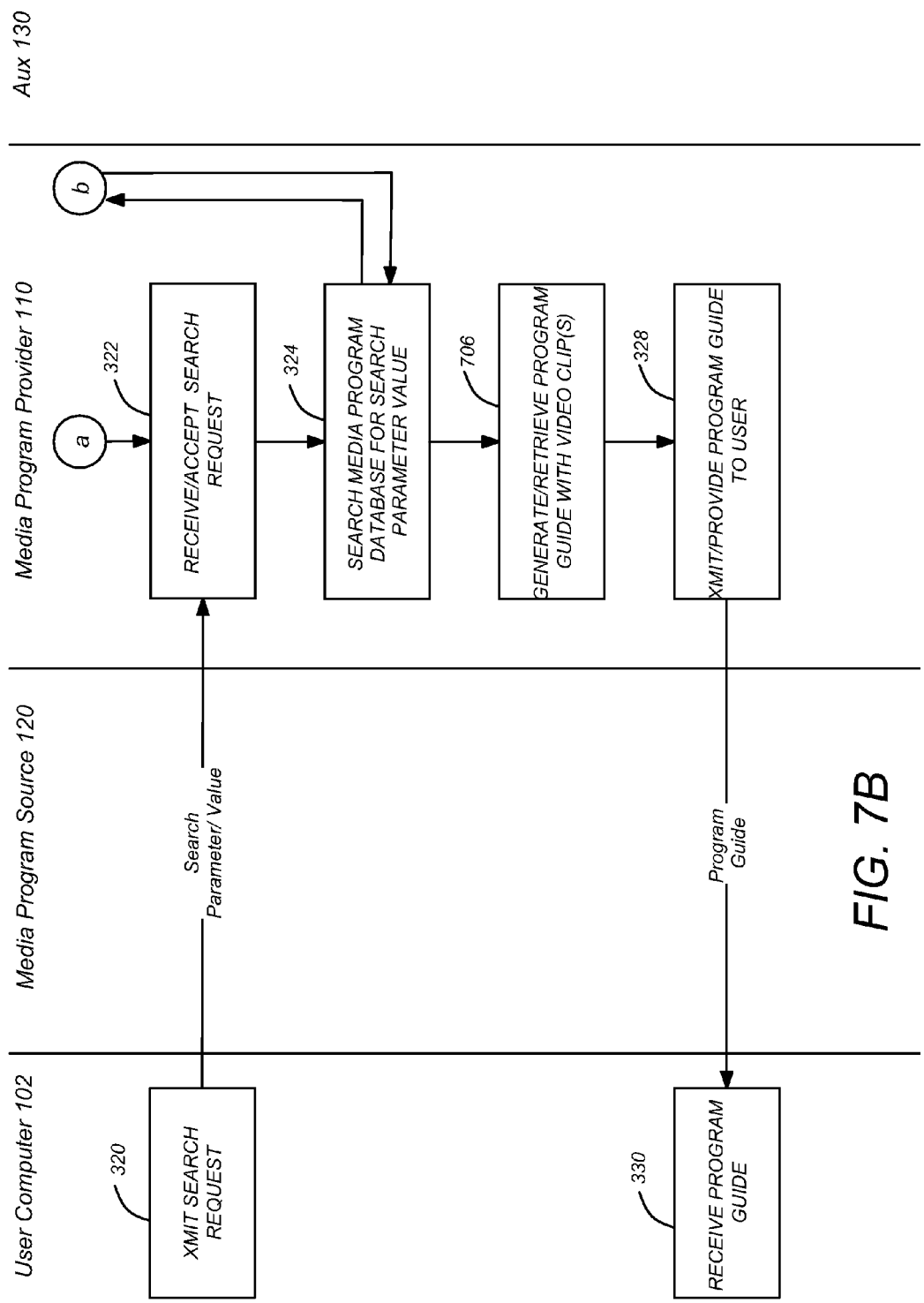

FIGS. 7A and 7B are diagram(s) depicting further exemplary method steps that can be used to generate and present search aware video clips. In this embodiment, the video clips are generated in advance of the user's search request. The operations depicted are analogous to those depicted and described in connection with FIG. 3A, except, the plurality of video frames is searched to identify one or more video clips that depict the object, and video clip data is generated, as depicted in blocks 702 and 704.

In one embodiment, the video clip is designated by identifiers for the first video frame and the last video frame in the clip. Further, the step of generating and retrieving the program guide comprises generating and retrieving a program guide with video clip(s) instead of static thumbnails, as shown in block 706.

The video clip(s) can be presented as static thumbnails in the program guide, and activated to play thumbnail-sized video clips upon selection by the user. This selection may be accomplished by using the mouse to rolling the screen pointer over the thumbnail, or by clicking on the thumbnail to select it.

Figure 8:
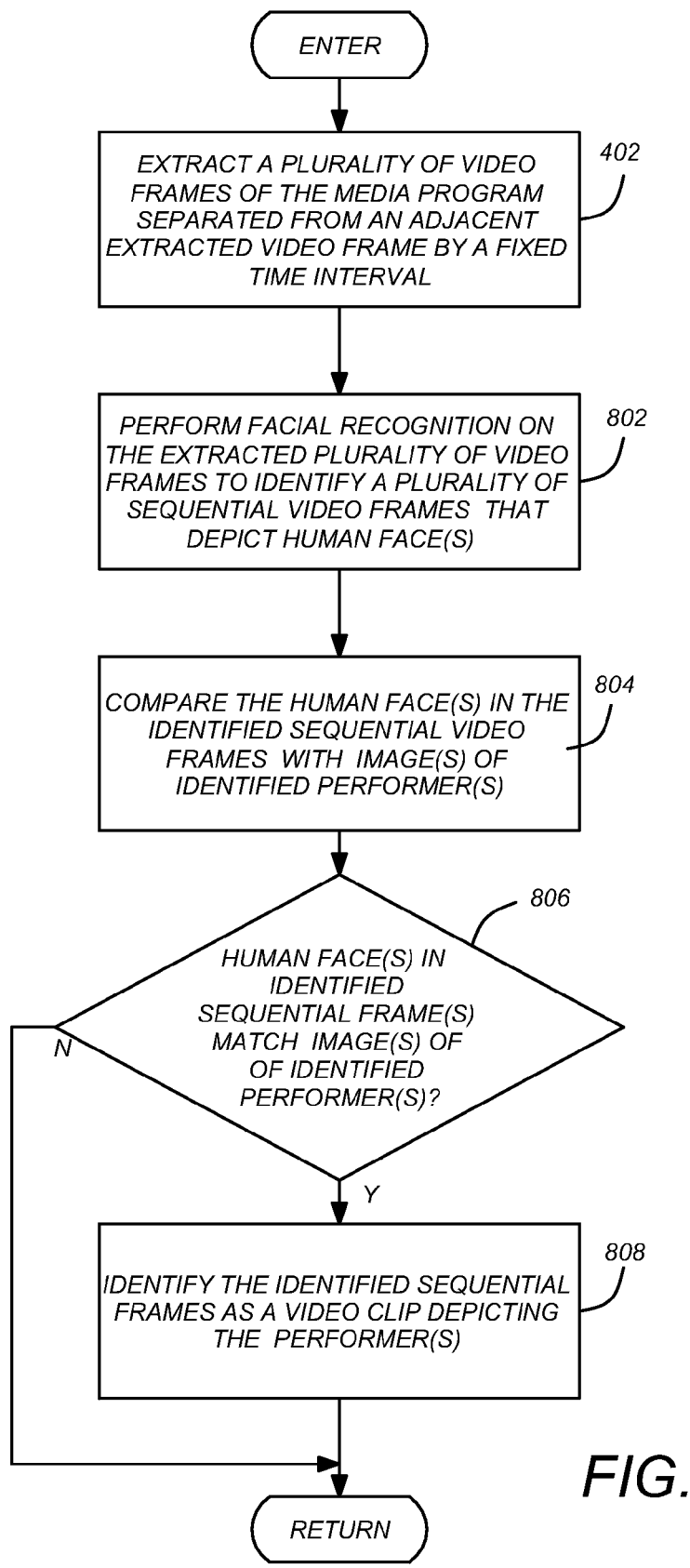
FIGS. 8 is a diagram illustrating exemplary method steps that can be used to search a plurality of video frames to identify one or more video clips that depict an object.

FIG. 8 is a diagram illustrating exemplary method steps that can be used to search the media program to identify one or more video clips that depict the object. The operations are analogous to those presented in FIG. 4, except that the facial recognition performed in block 802 is performed to identify a plurality of sequential video frames that depict human faces (thus identifying a video clip), the comparison identified in blocks 804 and 806 refers to sequential video frames, and the identified sequential video frames are identified as a video clip depicting the performer(s) in block 808.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Conclusion

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of presenting a program guide, comprising:
   (a) receiving a media program, the media program received from a media program source wherein the media program comprises a plurality of video frames, the media program one of a plurality of media programs of a media program database;
   (b) searching the plurality of video frames of the received media program to identify a set of video frames that depict different performers in a plurality of performers;
   (c) generating thumbnail metadata for the identified set of video frames, the thumbnail metadata relating information describing one of the plurality of performers to an identifier of the identified video frame that depicts the one of the plurality of performers;
   (d) associating the thumbnail metadata with the received media program in the media program database;
   (e) accepting a search request from a user, the search request comprising a search parameter having a search value associated with one of the plurality of performers;
   (f) searching the media program database for the search value;
   (g) determining when the search value corresponds to the information describing a performer in the plurality of performers;
   (h) determining the identifier related to the information describing the performer in the thumbnail metadata; and
   (i) providing a search result identifying the media program, wherein a thumbnail of a video frame that depicts the performer is determined using the determined identifier and used to identify the media program in the search result, and wherein different thumbnails of different video frames that depict different performers in the plurality of performers are used to identify the media program in search results corresponding to different search requests for different performers.

2. The method of claim 1, wherein:
the media program comprises a plurality of scenes;
the performer is depicted in a plurality of scenes; and
the thumbnail metadata further comprises an identifier of a video frame that depicts the performer in each of the plurality of scenes.

3. The method of claim 1, wherein the method further comprises receiving media program metadata comprising information identifying the performer depicted in the media program.

4. The method of claim 3, wherein receiving media program metadata comprising information identifying the performer depicted in the media program comprises:
webcrawling for the information identifying the performer depicted in the media program.

5. The method of claim 3, wherein receiving media program metadata comprising information identifying the performer depicted in the media program comprises receiving the information from a media provider.

6. The method of claim 3, wherein:
the media program depicts the plurality of performers;
the received media program metadata comprises information regarding the plurality of performers; and
the method further comprises repeating steps (b)-(d) for all of the plurality of performers identified by the information.

7. The method of claim 3, wherein:
the information identifying the performer depicted in the media program comprises performer information; and
wherein searching the plurality of video frames of the received media program to identify the set of video frames that depict the different performers comprises:
   extracting the set of video frames of the media program, wherein each extracted video frame is separated from an adjacent extracted video frame by a fixed time interval;
   performing facial recognition on the extracted video frames to identify a video frame that depicts a human face;
   comparing the human face in the identified video frame with an image of the performer identified by the performer information; and
   identifying the identified video frame as depicting the performer if the human face in the identified frame and the image match.

8. The method of claim 7, wherein the media program comprises a plurality of scenes and wherein:
   (b) comprises searching the plurality of video frames of the media program to identify the set of video frames that depict different performers, the identified set of video frames including frames in the plurality of scenes; and
   (c) comprises generating further thumbnail metadata for the set of video frames, the further metadata further relating the information describing the different performers to an associated identifier for each of the identified video frames that depict the different performers.

9. The method of claim 8, wherein:
the thumbnail metadata further comprises scene information describing each of the plurality of scenes in which a frame depicting the performer is disposed; and
the search request comprises a second search parameter having a second value describing a scene; and
providing a thumbnail of the at least one video frame that depicts the performer if the search value matches the information describing the performer comprises:
   providing a thumbnail of the video frame that depicts the performer if the search value matches the information describing the performer and the second value matches the scene information associated with the video frame.

10. The method of claim 7, wherein:
comparing the human face in the identified frame with the image produces a plurality of matches, each match associated with a matching confidence; and
identifying the identified frame as depicting the performer if the human face in the identified frame and the image match comprises identifying the identified frame having the highest matching confidence as the frame depicting the performer.

11. An apparatus for presenting a program guide, comprising a processor communicatively coupled to a memory storing instructions:
means, performed by the processor according to the instructions stored in the memory, for receiving a media program in a video-on-demand system, the media program received from a media program source wherein the media program comprises a plurality of video frames, the media program one of a plurality of media programs of a media program database;

means, performed by the processor according to the instructions stored in the memory, for searching the plurality of video frames of the received media program to identify a set of video frames that depict different performers;

means, performed by the processor according to the instructions stored in the memory, for generating thumbnail metadata for the identified set of video frames, the thumbnail metadata relating information describing one of the plurality of performers to an identifier of the identified video frame that depicts the one of the plurality of performers;

means, performed by the processor according to the instructions stored in the memory, for associating the thumbnail metadata with the received media program in a the media program database;

means, performed by the processor according to the instructions stored in the memory, for accepting a search request from a user, the search request comprising a search parameter having a search value associated with one of the plurality of performers;

means, performed by the processor according to the instructions stored in the memory, for searching the media program database for the search value for the performer;

means, performed by the processor according to the instructions stored in the memory, for determining when the search value corresponds to the information describing a performer in the plurality of performers; and means, performed by the processor according to the instructions stored in the memory, for determining the identifier related to the information describing the performer in the thumbnail metadata; and means, performed by the processor according to the instructions stored in the memory, for providing a search result identifying the media program, wherein a thumbnail of a video frame that depicts the performer is determined using the determined identifier and used to identify the media program in the search result, and wherein different thumbnails of different video frames that depict different performers in the plurality of performers are used to identify the media program in search results corresponding to different search requests for different performers.

12. The apparatus of claim 11, wherein:
the media program comprises a plurality of scenes;
the performer is depicted in a plurality of scenes; and
the thumbnail metadata further comprises an identifier of a video frame that depicts the performer in each of the plurality of scenes.

13. The apparatus of claim 11, further comprising means, performed by the processor according to the instructions stored in the memory, for receiving media program metadata comprising information identifying the performer depicted in the media program.

14. The apparatus of claim 13, wherein the means for receiving media program metadata comprising information identifying performer depicted in the media program comprises:

means, performed by the processor according to the instructions stored in the memory, for webcrawling for the information identifying the performer depicted in the media program.

15. The apparatus of claim 13, wherein the means for receiving media program metadata comprising information identifying the performer depicted in the media program comprises means, performed by the processor according to the instructions stored in the memory, for receiving the information from a media provider.

16. The apparatus of claim 13, wherein:
the received media program metadata comprises information regarding the plurality of performers; and
the apparatus searches the plurality of video frames of the received media program to identify a video frame that depicts each of the performers, generates thumbnail metadata for the identified video frame depicting each of the performers, wherein the thumbnail metadata relates information describing each of the performers to an identifier of the identified video frame that depicts each of the performers, and associates the thumbnail metadata with the media program in a media program database.

17. The apparatus of claim 13, wherein:
the information identifying the performer depicted in the media program comprises performer information; and
wherein the means for searching the plurality of video frames of the received media program to identify the set of video frames that depict the different performers comprises:
means, performed by the processor according to the instructions stored in the memory, for extracting the set of video frames of the media program, wherein each extracted video frame is separated from an adjacent extracted video frame by a fixed time interval;
means, performed by the processor according to the instructions stored in the memory, for performing facial recognition on the extracted video frames to identify a video frame that depicts a human face;
means, performed by the processor according to the instructions stored in the memory, for comparing the human face in the identified video frame with an image of the performer identified by the performer information; and
means, performed by the processor according to the instructions stored in the memory, for identifying the identified video frame as depicting the performer if the human face in the identified frame and the image match.

18. The apparatus of claim 17, wherein the media program comprises a plurality of scenes and wherein:
the means for searching the plurality of video frames of the received media program to identify the set of video frames that depict a performer comprises means, performed by the processor according to the instructions stored in the memory, for searching the plurality of video frames of the media program to identify the set of video frames that depict different performers, the identified set of video frames including frames in the plurality of scenes; and
the means for generating thumbnail metadata for the identified video frame, the thumbnail metadata relating information describing the performer to an identifier of the identified video frame that depicts the performer comprises means, performed by the processor according to the instructions stored in the memory, for generating further thumbnail metadata for the set of video frames, the further metadata further relating the information describing the different performers to an associated identifier for each of the identified video frames that depict the different performers.

19. The apparatus of claim 18, wherein:
the thumbnail metadata further comprises scene information describing each of the plurality of scenes in which a frame depicting the performer is disposed; and
the search request comprises a second search parameter having a second value describing a scene; and
the means for providing a thumbnail of the video frame that depicts the performer if the search value matches the information describing the performer comprises:
means, performed by the processor according to the instructions stored in the memory, for providing a thumbnail of the video frame that depicts the performer if the search value matches the information describing the performer and the second value matches the scene information associated with the video frame.

20. The apparatus of claim 17, wherein:
the means for comparing the human face in the identified frame with the image produces a plurality of matches, each match associated with a matching confidence; and
the means for identifying the identified frame as depicting the performer if the human face in the identified frame and the image match comprises means, performed by the processor according to the instructions stored in the memory, for identifying the identified frame having the highest matching confidence as the frame depicting the performer.

21. A program storage device, readable by a computer, tangibly embodying at least one program of instructions executable by the computer to perform method steps of presenting a program guide, the method comprising:
(a) receiving a media program, the media program received from a media program source wherein the media program comprises a plurality of video frames, the media program one of a plurality of media programs of a media program database;
(b) searching the plurality of video frames of the received media program to identify a set of video frames that depict different performers in a plurality of performers;
(c) generating thumbnail metadata for the identified set of video frames, the thumbnail metadata relating information describing one of the plurality of performers to an identifier of the identified video frame that depicts the one of the plurality of performers;
(d) associating the thumbnail metadata with the received media program in the media program database;
(e) accepting a search request from a user, the search request comprising a search parameter having a search value associated with one of the plurality of performers;
(f) searching the media program database for the search value;
(g) determining when the search value corresponds to the information describing a performer in the plurality of performers;
(h) determining the identifier related to the information describing the performer in the thumbnail metadata; and
(i) providing a search result identifying the media program, wherein a thumbnail of a video frame that depicts the performer is determined using the determined identifier and used to identify the media program in the search result, and wherein different thumbnails of different video frames that depict different performers in the plurality of performers are used to identify the media program in search results corresponding to different search requests for different performers.

22. The program storage device of claim 21, wherein:
the media program comprises a plurality of scenes;
the performer is depicted in a plurality of scenes; and
the thumbnail metadata further comprises an identifier of a video frame that depicts the performer in each of the plurality of scenes.

23. The program storage device of claim 21, wherein the method further comprises receiving media program metadata comprising information identifying the performer depicted in the media program.

24. The program storage device of claim 23, wherein receiving media program metadata comprising information identifying performer depicted in the media program comprises:
webcrawling for the information identifying the performer depicted in the media program.

25. The program storage device of claim 23, wherein receiving media program metadata comprising information identifying the performer depicted in the media program comprises receiving the information from a media provider.

26. The program storage device of claim 23, wherein:
the received media program metadata comprises information regarding the plurality of performers; and
the method steps further comprises the step of repeating steps (b)-(d) for all of the plurality of performers identified by the information.

27. The program storage device of claim 23, wherein:
the information identifying the performer depicted in the media program comprises performer information; and
wherein searching the plurality of video frames of the received media program to identify the set of video frames that depict the different performers comprises:
extracting the set of video frames of the media program, wherein each extracted video frame is separated from an adjacent extracted video frame by a fixed time interval;
performing facial recognition on the extracted video frames to identify a video frame that depicts a human face;
comparing the human face in the identified video frame with an image of the performer identified by the performer information; and
identifying the identified video frame as depicting the performer if the human face in the identified frame and the image match.

28. The program storage device of claim 27, wherein the media program comprises a plurality of scenes and wherein:
(b) comprises searching the plurality of video frames of the media program to identify the set of video frames that depict different performers, the identified set of video frames including frames in the plurality of scenes; and
(c) comprises generating further thumbnail metadata for the set of video frames, the further metadata further relating the information describing the different performers to an associated identifier for each of the identified video frames that depict the different performers.

29. The program storage device of claim 28, wherein:
the thumbnail metadata further comprises scene information describing each of the plurality of scenes in which a frame depicting the performer is disposed; and
the search request comprises a second search parameter having a second value describing a scene; and the method step of providing a thumbnail of the at least one video frame that depicts the performer if the search value matches the information describing the performer comprises the method step of:

provide a thumbnail of the video frame that depicts the performer if the search value matches the information describing the performer and the second value matches the scene information associated with the video frame.

30. The program storage device of claim 27, wherein:

the method step of comparing the human face in the identified frame with the image produces a plurality of matches, each match associated with a matching confidence; and the method step of identifying the identified frame as depicting the performer if the human face in the identified frame and the image match comprises the method step of identifying the identified frame having the highest matching confidence as the frame depicting the performer.

31. A method of presenting a program guide, describing a plurality of media programs, each media program having a plurality of video frames, the method comprising:

accepting a search request from a user, the search request comprising a search parameter having a search value;

searching a media program database for the search value, the media program database having first metadata associated with a first individual video frame of the media program;

determining if the first metadata includes the search value for a performer, wherein the first metadata associated with the first individual video frame of the media program is generated by performing:

receiving the media program from a media program source;

searching the plurality of video frames of the media program to identify a video frame that depicts the performer; and generating the first metadata associated with the video frame that depicts the performer, the first metadata relating information describing the performer to an identifier of the identified video frame that depicts the performer; and providing the program guide comprising a thumbnail depicting the performer included in the first individual video frame of the media program associated with the first metadata to the user if the first metadata includes the search value, wherein the thumbnail is used to identify the media program in the program guide, and wherein different thumbnails of different video frames that depict different performers are used to identify the media program in the program guide for different search requests for different performers.

32. The method of claim 31, wherein the media program database further has second metadata associated with a second individual frame of the media program, and wherein the method further comprises:

providing a second thumbnail depicting the second individual frame of the media program if the second metadata includes the search parameter.

33. The method of claim 31, wherein:

the method further comprises receiving media program metadata comprising information identifying performers depicted in the media program; and searching the plurality of video frames of the media program to identify a video frame that depicts the performer and generating the first metadata associated with the video frame that depicts the performer is performed for each of the identified performers.

34. The method of claim 31, wherein:

the information identifying the performer depicted in the media program comprises performer information; and wherein searching the plurality of video frames of the received media program to identify a video frame that depicts the performer comprises:

extracting the plurality of video frames of the media program, wherein each extracted video frame is separated from an adjacent extracted video frame by a fixed time interval;

performing facial recognition on the extracted video frames to identify a video frame that depicts a human face;

comparing the human face in the identified video frame with an image of the performer identified by the performer information; and identifying the identified video frame as depicting the performer if the human face in the identified frame and the image match.

35. An apparatus for presenting a program guide, describing a plurality of media programs, each media program having a plurality of video frames, the apparatus having a processor and a memory storing instructions and further comprising:

means, performed by the processor according to the instructions stored in the memory, for accepting a search request from a user, the search request comprising a search parameter having a search value;

means, performed by the processor according to the instructions stored in the memory, for searching a media program database for the search value, the media program database having first metadata associated with a first individual video frame of the media program;

means, performed by the processor according to the instructions stored in the memory, for determining if the first metadata includes the search value for a performer, wherein the first metadata associated with the first individual video frame of the media program is generated by:

means, performed by the processor according to the instructions stored in the memory, for receiving the media program from a media program source;

means, performed by the processor according to the instructions stored in the memory, for searching the plurality of video frames of the media program to identify a video frame that depicts the performer; and means, performed by the processor according to the instructions stored in the memory, for generating the first metadata associated with the video frame that depicts the performer, the first metadata relating information describing the performer to an identifier of the identified video frame that depicts the performer; and means, performed by the processor according to the instructions stored in the memory, for providing the program guide comprising a thumbnail depicting the performer included in the first individual video frame of the media program associated with the first metadata to the user, wherein the thumbnail is used to identify the media program in the program guide, and wherein different thumbnails of different video frames that depict different performers are used to identify the media program in the program guide for different search requests for different performers.

36. The apparatus of claim 35 wherein the media program database further has second metadata associated with a second individual frame of the media program; and wherein the apparatus further comprises:
means, performed by the processor according to the instructions stored in the memory, for providing a second thumbnail depicting the second individual frame of the media program if the second metadata includes the search parameter.

37. The apparatus of claim 35, wherein:
the apparatus further comprises means, performed by the processor according to the instructions stored in the memory, for receiving media program metadata comprising information identifying performers depicted in the media program; and
the means for searching the plurality of video frames of the media program to identify a video frame that depicts the performer and for generating the first metadata associated with the video frame that depicts the performer searches the plurality of video frames of the media program to identify a video frame that depicts the performer and generates the first metadata associated with the video frame that depicts the performer for each of the identified performers.

38. The apparatus of claim 35, wherein:
the information identifying the performer depicted in the media program comprises performer information; and
wherein the means for searching the plurality of video frames of the received media program to identify a video frame that depicts the performer comprises:
means, performed by the processor according to the instructions stored in the memory, for extracting the plurality of video frames of the media program, wherein each extracted video frame is separated from an adjacent extracted video frame by a fixed time interval;
means, performed by the processor according to the instructions stored in the memory, for performing facial recognition on the extracted video frames to identify a video frame that depicts a human face;
means, performed by the processor according to the instructions stored in the memory, for comparing the human face in the identified video frame with an image of the performer identified by the performer information; and
means, performed by the processor according to the instructions stored in the memory, for identifying the identified video frame as depicting the performer if the human face in the identified frame and the image match.

39. A program storage device, readable by a computer, tangibly embodying at least one program of instructions executable by the computer to perform method steps of presenting a program guide for a video-on-demand system describing a plurality of media programs, each media program having a plurality of video frames, the method steps comprising:
accepting a search request from a user, the search request comprising a search parameter having a search value;
searching a media program database for the search value, the media program database having first metadata associated with a first individual video frame of the media program;
determining if the first metadata includes the search value for a performer, wherein the first metadata associated with the first individual video frame of the media program is generated by performing:
receiving the media program from a media program source;
searching the plurality of video frames of the media program to identify a video frame that depicts the performer; and
generating the first metadata associated with the video frame that depicts the performer, the first metadata relating information describing the performer to an identifier of the identified video frame that depicts the performer; and
providing the program guide comprising a thumbnail depicting the performer included in the first individual video frame of the media program associated with the first metadata to the user using the determined identifier, wherein the thumbnail is used to identify the media program in the program guide, and wherein different thumbnails of different video frames that depict different performers are used to identify the media program in the program guide for different search requests for different performers.

40. The program storage device of claim 39, wherein the media program database further has second metadata associated with a second individual frame of the media program; and wherein the method further comprises:
providing a second thumbnail depicting the second individual frame of the media program if the second metadata includes the search parameter.

41. The program storage device of claim 39, wherein:
the method further comprises receiving media program metadata comprising information identifying performers depicted in the media program; and
searching the plurality of video frames of the media program to identify a video frame that depicts the performer and generating the first metadata associated with the video frame that depicts the performer is performed for each of the identified performers.

42. The program storage device of claim 39, wherein:
the information identifying the performer depicted in the media program comprises performer information; and
wherein searching the plurality of video frames of the received media program to identify a video frame that depicts the performer comprises:
extracting the plurality of video frames of the media program, wherein each extracted video frame is separated from an adjacent extracted video frame by a fixed time interval;
performing facial recognition on the extracted video frames to identify a video frame that depicts a human face;
comparing the human face in the identified video frame with an image of the performer identified by the performer information; and
identifying the identified video frame as depicting the performer if the human face in the identified frame and the image match.

* * * * *